(12) United States Patent
Sebben et al.

(10) Patent No.: US 6,272,818 B1
(45) Date of Patent: Aug. 14, 2001

(54) PIVOTABLY ADJUSTABLE FILL INDICATOR (75) Inventors: Daniel Angelo Sebben, Hartford; Melvin Orville Lux, Oshkosh; Timothy Paul Zellmer, Horicon; Matthew Paul Gueller, Slinger, all of WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/179,041

(22) Filed: Oct. 26, 1998

(51) Int. Cl.[7] .............................. A01D 43/06; A01D 75/00
(52) U.S. Cl. .......................................... 56/10.2 R; 56/202
(58) Field of Search ..................... 56/202, 194, 10.2 R, 56/DIG. 15; 340/612, 686; 200/47, 61.2, 61.21; 116/303; 73/290 R (56) References Cited

U.S. PATENT DOCUMENTS

| | | | |
|---|---|---|---|
| 382,343 | * 5/1888 | Whitson | 111/116 |
| 2,627,244 | * 2/1953 | Herigstad | 116/303 |
| 3,246,313 | * 4/1966 | Weaklend | 340/617 |
| 3,393,280 | * 7/1968 | Skelton et al. | 200/61.21 |
| 3,626,402 | * 12/1971 | Price | 340/521 |
| 3,685,356 | * 8/1972 | Zimmerman | 73/290 R |
| 3,802,173 | 4/1974 | Opitz | 56/202 |
| 3,885,639 | 5/1975 | McLarrin | 117/172 |
| 3,971,198 | 7/1976 | Lane | 56/202 |
| 3,974,631 | 8/1976 | Rhodes | 56/202 |
| 4,198,626 | 4/1980 | Rauscher | 340/613 |
| 4,259,832 | 4/1981 | DuRay | 56/202 |
| 4,924,664 | 5/1990 | Hicks et al. | 56/202 |
| 4,964,266 | * 10/1990 | Kolb | 56/202 |
| 4,977,850 | 12/1990 | King | 116/109 |
| 4,981,011 | 1/1991 | Olejak | 56/10.2 |
| 4,993,232 | * 2/1991 | Tatmatsu et al. | 340/612 |
| 5,088,323 | * 2/1992 | Johnson et al. | 73/290 R |
| 5,321,939 | 6/1994 | Fuse et al. | 56/10.2 |
| 5,388,394 | 2/1995 | Heismann | 56/194 |
| 5,425,223 | 6/1995 | DeLaRonde | 56/10.2 R |
| 5,605,033 | 2/1997 | Olmr | 56/10.2 R |
| 5,775,077 | 7/1998 | Olmr | 56/202 |
| 5,832,708 | * 11/1998 | Sugden | 56/202 |
| 5,950,408 | * 9/1999 | Schaedler | 56/202 |
| 5,959,218 | * 9/1999 | Stubbe | 73/861.73 |
| 5,960,613 | * 10/1999 | Mixon et al. | 56/10.2 R |

FOREIGN PATENT DOCUMENTS

| | | |
|---|---|---|
| 0 532 068 A1 | 9/1993 | (DE) . |
| 0 687 407 A1 | 12/1995 | (DE) . |
| 0 129 613 | 1/1985 | (EP) . |
| 0 220 754 | 5/1987 | (EP) . |

OTHER PUBLICATIONS

Patent abstract of Japan 02131521 dated May 21, 1990.
Patent abstract of Japan 01269423 dated Oct. 26, 1989.
Three photographs of a grass clippings container product with a fill sensor switch and lever directly beneath the clippings inlet. The product as shown has been sold in Europe by a company known as Castelgarden since approximately 1993.

* cited by examiner

*Primary Examiner*—Thomas B. Will
*Assistant Examiner*—Meredith Petravick (57) ABSTRACT

A fill indicator for a clippings collection container of a mower having a lever pivotable in response to grass clippings piling up on top of the lever. The lever and the electrical switch that the lever engages are pivotable about an axis as a unit to adjust the sensitivity of the fill indicator.

11 Claims, 10 Drawing Sheets

PIVOTABLY ADJUSTABLE FILL INDICATOR

BACKGROUND OF THE INVENTION

Conventional mowers include a mower deck that is mounted beneath a vehicle such as a lawn and garden tractor. Mower blades rotate within the mower deck for cutting vegetation and grass into clippings. The mower blades then direct the clippings out a discharge opening formed in the periphery of the mower deck. One type of mower has a discharge opening positioned at the rear of the deck beneath the vehicle for directing clippings rearwardly out of the deck along the centerline of the vehicle. The mower deck typically has two blades rotating side by side and in opposite directions so that a rearward and upward current of air is generated between the blades along the centerline of the vehicle. A clippings chute is provided which extends upwardly and rearwardly from the rear discharge opening. The chute passes upwardly generally along the centerline of the vehicle and generally between the rear drive wheels. A clippings container or bagger is mounted to the rear of the lawn tractor. The chute opens into the container for directing clippings from the mower deck into the container. These rear discharge mowers are advantageous in that the clippings are directed out of the mower deck, through the chute and into the container with a relatively straight trajectory and without having to round any curves or corners. Therefore, the clippings retain a relatively high velocity, which reduces plugging and eliminates the need for a supplemental blower or fan mechanism for forcing the air into the container.

It is known to provide grass clippings containers with fill indicator mechanisms. Fill indicators have taken a number of different forms. One type of fill indicator includes an arm pivotable about an axis. The arm is positioned within the clippings container or bagger such that as the grass pile on the floor of the container accumulates and grows clippings will eventually accumulate on top of the arm, causing the arm to pivot downwardly. Pivotal motion of the arm engages an electrical switch, which then sounds an audible alarm alerting the operator that the container is close to becoming full. This type of fill indicator has been positioned within the container near the location where the chute opens into the container. This is generally the last portion of the container to become filled with grass, and therefore positioning the fill indicator directly beneath and in close proximity to the chute outlet helps ensure the indicator is not activated until the container is almost full. The fill indicator is positioned to be triggered when clippings pile up to such an extent that the pile approaches the chute opening.

Conventional fill indicators of this type have the disadvantage of being actuated at different degrees of bagger fullness depending on the conditions of the clippings. For example, if the clippings are very dry and light, then the fill indicator may not be triggered until the clippings container is overfilled. The light clippings apply only a relatively small force against the arm which may not be sufficient to pivot the arm. When the clippings are wet, thick or heavy, the fill indicator may be triggered too soon by the weight of small accumulations of clippings on the arm or the force applied by airborne clippings. Heavy clippings apply a relatively large force against the arm which may be sufficient to pivot the arm before the container becomes full. Also, clippings may accumulate unevenly within conventional clippings containers and may pile up proximate the fill indicator. If clippings pile up near the fill indicator in this way before piling up in the other areas of the container, then the fill indicator may be triggered too soon. Uneven distribution of clippings within the container can thereby trigger the fill indicator prematurely before the container is actually filled.

It would therefore be desirable to provide a fill indicator that can accurately warn the operator that the bag is full or nearly full and about to clog the chute. It would be desirable for such a fill indicator to function properly and accurately when the mower is operating in a variety of different operating conditions, such as in light, dry grass and leaves, or in heavy wet grass. It would also be desirable to provide a clippings container whose entire volume is filled evenly before the fill indicator is actuated, so that the fill indicator is not triggered when the container is only partially filled. This would reduce the frequency at which the container is emptied by the operator and increase the efficiency of the mowing operations.

SUMMARY OF THE INVENTION

The present invention provides an adjustable fill indicator which alerts the operator of a mowing vehicle that the clippings container is about to become full and the chute is about to clog. A mower deck carried beneath a lawn tractor between the front and rear pairs of wheels includes a rear discharge outlet. Counter-rotating blades direct clippings out the discharge outlet and into a clippings chute that extends rearwardly and upwardly generally along the centerline of the vehicle and generally between the rear pair of tractor wheels. A clippings container is carried at the rear of the vehicle and receives the flow of clippings from the chute.

A fill indicator is positioned within the container directly beneath the chute. The fill indicator includes a lever that extends into the container. As clippings accumulate within the container they eventually pile up on top of the lever, causing the lever to pivot downwardly under the weight of the accumulating clippings pile. The pivoting lever presses upwardly on a leaf spring that depresses a button of an electrical switch. Engagement of the switch sounds an audible alarm that alerts the operator that the container is nearly full. The position of the fill indicator adjacent the chute causes the fill indicator to be triggered directly before the chute becomes clogged with clippings.

The fill indicator is pivotally adjustable by an operator about a horizontal and laterally extending axis. The operator can adjust the angular position of the lever, leaf spring and switch, which pivot as a unit about a single axis during adjustments. When the lever is adjusted to a relatively outright or horizontally extending orientation, a relatively light downward force applied to the lever by a pile of clippings will cause the lever to pivot downwardly and trigger the switch. The large moment arm established by the outstretched lever results in relatively large torque forces when downward force is applied to the lever. This causes the lever to pivot when a relatively light pile of clippings falls on the lever. The lever can therefore be adjusted to this setting when operating in relatively light dry grass or leaves. The lever pivots and the switch will be activated when a pile of light clippings falls on the lever, and therefore the fill indicator will alert the operator that the container is nearly full.

The fill indicator can be adjusted by the operator so that the lever extends downwardly relatively vertically within the container. In this orientation the lever requires a relatively large downward force to be applied to the lever in order for the lever to pivot downwardly. In this orientation the downward force is applied to the lever at a relatively short perpendicular distance from the pivot axis of the lever, and therefore a relatively small moment arm is established. This results in a relatively small torque force when downward forces are applied to the lever, and therefore a relatively large force must be applied to the lever in order to pivot the lever and actuate the switch. The operator may wish to adjust the fill indicator to this setting when mowing in relatively thick, heavy or wet grasses. In this setting the lever is generally hindered from pivoting when contacted by wet or relatively heavy airborne clippings circulating within the container. The lever is pivoted only when a sufficient amount of clippings accumulate on the lever, and the fill indicator will generally not be triggered prematurely before the container is actually nearly full. False alarms are thereby generally reduced since the fill indicator will sound the alarm only when the container is nearly full and not before. Mowing efficiency is enhanced since the frequency of stops for dumping operations is generally reduced.

The shape of the lever also contributes to how the sensitivity of the fill indicator is altered as the lever is pivoted to different positions by the operator. In its most outright horizontal orientation, a wide portion at the end of the lever is oriented relatively horizontally for receiving downwardly directed forces from clippings accumulating near the fill indicator. Because of the large surface area of the wide portion of the lever, large amounts of light clippings can accumulate and bear down against the wide portion, which is a large distance from the lever's pivot axis. A large moment arm is established and a large torques force is applied to the lever by clippings bearing down on the wide portion. Therefore it is advantageous to orient the lever in this mode during operation in light grass or leaves, so that the fill indicator will accurately sense the accumulation of clippings and will trigger the switch when light clippings accumulate on the lever and before they clog the discharge outlet. When the lever is pivoted to a more downward, vertical orientation by the operator, the wide portion is oriented generally vertically so that it generally will not receive downwardly directed forces from the weight of accumulated clippings. A narrower portion of the lever must receive these forces. Because of the smaller surface area of the narrow portion, and the closer proximity of the narrow portion to the lever's pivot axis, a smaller moment arm is established and larger forces must be encountered by the lever in order to pivot the lever and actuate the switch. Therefore it is advantageous to orient the lever in this mode during operation in heavy or wet grass so that the alarm is not triggered prematurely.

An adjustable fill indicator can also be provided that includes a weight member slidably mounted to the lever. The position of the weight member on the lever is adjustable to alter the sensitivity of the fill indicator. When the weight member is positioned in the end of the slot nearest the switch and relatively close to the pivot axis of the lever, the weight of the weight member is directed a relatively small perpendicular distance from the lever's pivot axis, and therefore the weight of the weight member applies only a relatively small torque force to the lever for pivoting the lever downwardly. Therefore, a relatively large downward load must be applied to the lever by grass clippings in order to pivot the lever downwardly and actuate the switch. The operator may wish to adjust the weight member to this position when mowing wet or heavy grass. Since the lever must encounter relatively large loads in order to pivot the lever downward and actuate the switch, the lever will tend not to pivot when airborne clippings strike the lever. False alarms would therefore be reduced. The operator can also adjust the weight member to the end of the slot farthest from the lever's pivot axis and closest to the outer end of the lever. In this location the weight of the weight member is directed a relatively large perpendicular distance from the lever's pivot axis, which establishes a relatively large torque force applied to the lever. This torque force alone however is not large enough to pivot the lever downwardly. Since the torque force applied to the lever by the weight of the weight member is relatively large, only a relatively small force must be applied to the lever by grass clippings in order to pivot the lever downwardly and actuate the switch. Therefore, accumulations of relatively light grass that pile up on the lever will have sufficient weight, in conjunction with the weight of the weight member, to pivot the lever about the pivot axis and actuate the switch. In this configuration the lever is sufficiently sensitive to pivot under the relatively light force applied by light, dry grass and leaves. Therefore the fill indicator will sense the accumulation of a grass clippings pile at the location of the fill indicator before the clippings pile overflows into and clogs the chute outlet.

The present invention also includes a mechanism for improving the distribution of clippings within the container. A V-shaped deflector is positioned within the container in the stream of clippings flowing out of the chute. A portion of the clippings flowing out of the chute strike the two surfaces of the deflector and are directed laterally outwardly toward the side portions of the container. This causes the side portions of the container to fill with clippings. The deflector is positioned such that a portion of the clippings stream will pass directly beneath the deflector and travel straight back to the central rearward portion of the container. This causes the middle or central portion of the container to also fill with clippings. The clippings will therefore settle downwardly and accumulate on the floor of the container with a relatively even distribution across the middle and side portions of the container. Therefore, as the clippings pile up and eventually depress the lever and actuate the fill indicator, the container will be generally full. The deflector therefore helps prevent the fill indicator from being triggered before the container is actually full. The frequency of unnecessary or premature stops for dumping is generally reduced, and the efficiency of the mowing operations is increased.

DESCRIPTION OF THE PREFERRED EMBODIMENT

Referring now to FIGS. 1–9, there is shown the preferred embodiment of the present invention. A lawn and garden tractor 10 is provided having a front pair of steerable wheels 12 and a rear pair of driven wheels 14. An engine 16 mounted at the front of the vehicle 10 drives the rear pair of wheels 14, and supplies rotational power via a belt system to mower blades rotating within a mower deck 18. The blades cut or mow grass and vegetation in conventional fashion. The mower deck 18 is positioned beneath the vehicle 10 and between the front and rear pairs of wheels 12 and 14. The mower deck 18 defines a discharge outlet 20 through which the clippings cut by the blades flow out of the mower deck 18. A clippings chute 22 receives the clippings from the discharge outlet 20 and directs the clippings upwardly and rearwardly generally between the rear pair of wheels 14 along the centerline of the vehicle 10. The chute 22 extends generally within the framework of the vehicle 10 and opens into a clippings collection container 24 mounted to the rear of the tractor 10. The chute 22 thereby directs clippings from the mower deck 18 into the clippings collection container 24.

A first container portion 32 defines the forward walls of the container 24 and remains fixed with the vehicle 10 during all phases of operation. A second container portion 34 defines the rearward walls of the container 24 and is pivotally mounted to the first portion 32 by way of a hinge structure 36. The first and second portions 32 and 34 fit together and generally form a seal against each other for confining clippings directed into the container 24 from the chute 22. The second portion 34 is pivotal to an open position to allow the clippings contents of the container 24 to be dumped or emptied.

Figure 10:
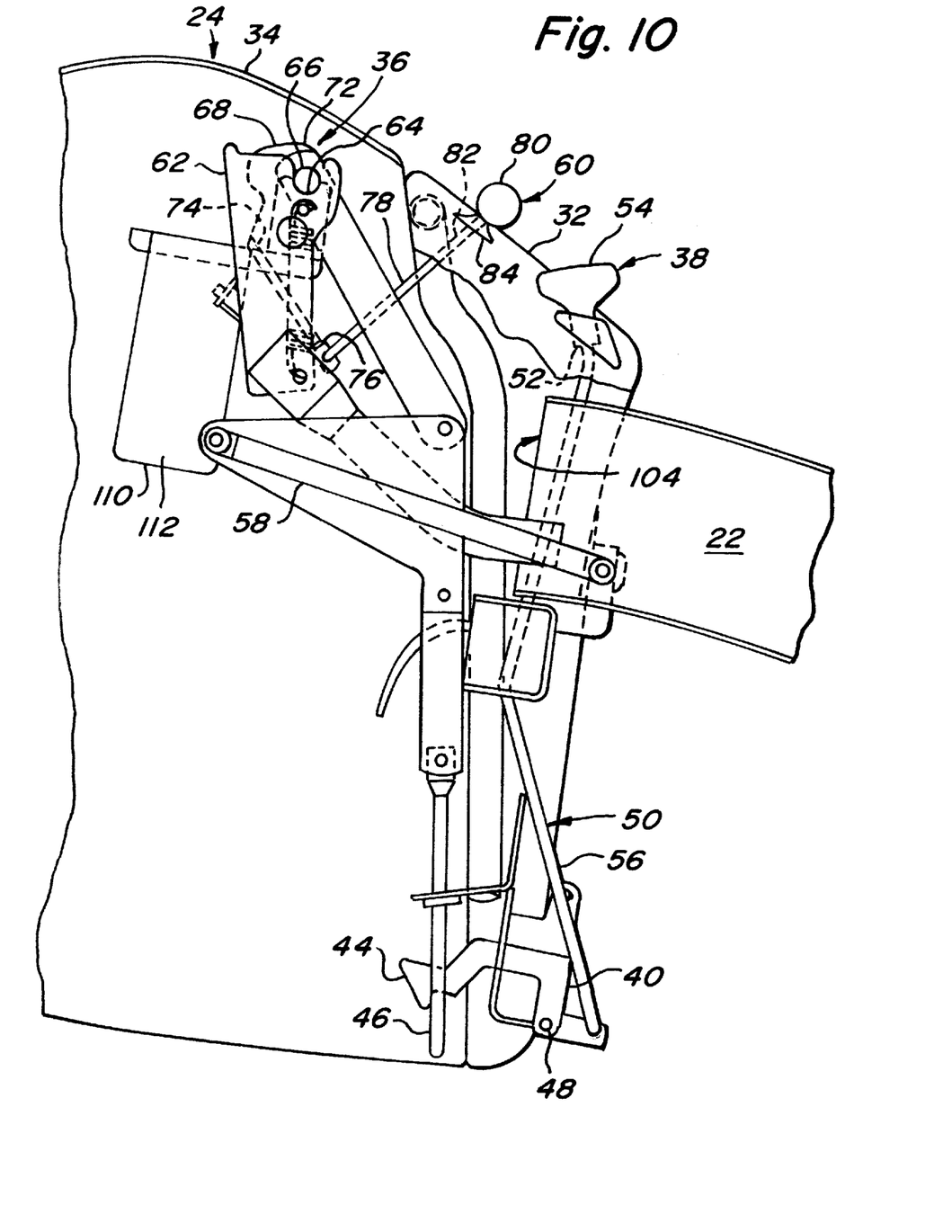
FIG. 10 is a side view of first and second portions of the container, with the hinge mechanism and first and second control linkages shown in detail.

A first control mechanism 38 is provided which, when actuated, allows an operator to open the container 24 for dumping its contents while seated on the lawn tractor vehicle 10. A pair of first latches 40 and 42 are pivotably mounted with the first portion 32. The latches 40 and 42 include hooked portions 44 that are engagable with rod members 46 carried by the second portion 34 of the container 24. When the rod members 46 are captured within the hooked end portions 44 of the first latches 40 and 42 the second portion 34 is secured in its closed position for containing grass clippings. When the first latches 40 and 42 pivot to release the rod members 46 from the hooked portions 44, the second portion 34 of the container 24 is free to swing upwardly and rearwardly to an open position allowing the clippings within the container 24 to fall onto the ground. A shaft 48 extends between the first latches 40 and 42 for transmitting pivotal motion therebetween. A first linkage 50 is connected with one of the first latches 40 and extends upwardly through an opening 52 formed in the first portion 32 of the container 24. During mowing operations the first latches 40 and 42 engage the rod members 46 for securely retaining the second portion 34 of the container 24 in its closed position in abutment with the first portion 32 of the container 24. When the container 24 becomes full during mowing operations the operator can empty the contents of the container 24 by pressing down on a first knob 54. This causes first link 56 to shift downwardly, which in turn causes the first latch 40 to pivot about the axis of the shaft 48. The shaft 48 transmits this rotational motion of one latch 40 to the other latch 42, causing both latches 40 and 42 to swing upwardly simultaneously to release the rod members 46 from the hooked end portions 44. The second portion 34 of the container 24 is then free to pivot open about the axis defined by the hinge mechanism 36.

Gas cylinders 58 bias the second portion 34 to swing open, so that when the first latches 40 and 42 release the rod members 46 the gas cylinders 58 will immediately apply a force to swing the second portion 34 open. If the contents of the container 24 are relatively light, the gas cylinders 58 may open the container 24 without requiring any further effort from the operator. If the contents of the container 24 are relatively heavy, the operator may be required to manually open the second portion 34 of the container 24. The gas cylinders 58 apply a force to the second portion 34 to assist the operator in swinging the second portion 34 to its open position. The clippings that have accumulated in the container 24 then fall downwardly onto the ground under their own weight once the second portion 34 swings open.

A second control 60 is provided for allowing the second portion 34 of the container 24 to be completely removed from the first portion 32 of the container 24. A pair of brackets 62 are fixed with the first portion 32 and include recesses 64 within which a pivot shaft 66 is received. The pivot shaft 66 is fixed with the second portion 34 and defines the axis about which the second portion 34 pivots when swinging between its open and closed positions. A pair of second latches 68 and 70 are swingably mounted with the brackets 62, and include hooked portions 72 that serve to confine the pivot shaft 66 within the recesses 64. A rod 74 extends between the second latches 68 and 70 for transmitting pivotal motion therebetween. Arm portion 76 extends from the rod 74. A second link 78 is pivotally connected with the arm portion 76, and a second knob member 80 is mounted to the upper end 82 of the second link 78. The second link 78 is positioned within an opening 84 defined by the first portion 32 of the container 24.

During mowing operations the hinge mechanism 36 is in a locked mode with the second latches 68 and 70 pivoted to positions whereat the hooked portions 72 confine or block the pivot shaft 66 within the recesses 64. The second portion 34 is thereby securely mounted to the first portion 32. As the operator engages the first control 38 for opening the second portion 34 and dumping the contents of the container 24 the second portion 34 will pivot about the axis defined by the pivot shaft 66. The operator may wish to remove the second portion 34 from the first portion 32 of the container 24. Removal of the second portion 34 allows an operator to install auxiliary attachments such as a baffle that can be mounted to the end of the chute 22 for dispersing clippings onto the surface of the ground. Removal of the second portion 34 also allows for compact storage of the vehicle 10, and provides access to the chute outlet 104 and interior of the container 24 for cleaning. To remove the second portion 34 the operator will first open the second portion 34 by depressing the first knob 54. With the second portion 34 open the operator can then detach the gas cylinders 58 from the first portion 32 of the container 24. The operator may then pull upwardly on the second knob 80, which shifts the second link 78 upwardly within the opening 84 in the first portion 32. This causes the arm portion 76 to swing forwardly. The second latches 68 and 70, which are connected via the rod 74, pivot with the arm portion 76, and the hooked portions 72 swing rearwardly to generally open or uncover the recesses 64. The pivot shaft 66 is then no longer blocked by the hooked portions 72 from being removed from the recesses 64. In this configuration the operator can lift the pivot shaft 66 out of the recesses 64, thereby removing the second portion 34 from the first portion 32 entirely.

A fill indicator 86 is positioned within the container 24 and functions to alert the operator that the container 24 is on the verge of becoming full. The fill indicator includes an arcuate lever or paddle member 88 having a first portion 90 that extends into the container 24. The lever 88 is pivotally mounted to a mounting member 92. The mounting member 92 is pivotally supported by an attachment bracket 94 bolted or otherwise fixed to the inside of the container 24. Also mounted to the mounting member 92 is an electrical switch 96. A leaf spring 98 abuts a switch button 100 and extends outwardly to engage a second portion 102 of the lever 88. As grass clippings accumulate within the container 24 they will eventually fall onto and abut against the first or rear portion 90 of the lever 88, causing the first portion 90 of the lever 88 to pivot downwardly. As the rear portion 90 of the lever 88 swings downwardly due to the force applied by the clippings, the second end portion 102 of the lever 88 will swing upwardly against the leaf spring 98, causing the leaf spring 98 to depress the button 100. This actuates the switch 96, which triggers an audible alarm that informs the operator that the fill indicator 86 has been actuated and that the container 24 is almost full. The operator can then stop mowing and empty the container 24 before the chute 22 becomes clogged.

The fill indicator 86 is positioned directly beneath the outlet of the chute 22. The fill indicator 86 is located in this position so that it is triggered by the accumulation of clippings near the chute outlet 104. If clippings accumulate in the container 24 to such an extent clippings back up into the chute outlet 104 thereby clogging the chute 22, then the operator will have to stop mowing and reach his hand into the chute 22 to unclog clippings from the chute 22. This can be a time consuming and messy process, and is an undesirable interruption to mowing operations. Therefore, the fill indicator 86 is positioned directly beneath the outlet 104 of the chute 22 so that it will be triggered when grass clippings accumulating within the container 24 approach the outlet 104 of the chute 22.

The fill indicator 86 can be manipulated to a plurality of positions for allowing the operator to adjust the sensitivity of the indicator 86. The fill indicator 86 is adjustable so that the indicator 86 will be triggered at different angular positions of the lever, which allows the indicator to alert the operator at the proper time in various mowing conditions, such as thick, wet, heavy grass or dry, light grass. The mounting member 92 is pivotal about its axis 126 defined by its connection with the attachment bracket 94. A swing arm 106 is operatively fixed with the mounting member 92 and can be grasped by the operator for swinging the mounting member 92 about its axis. The switch 96, leaf spring 98 and lever 88 are mounted with the mounting member 92 and therefore pivot as a unit with the mounting member 92 and swing arm 106. The swing arm 106 is held in its various positions by a leg 122 received in one of a plurality of openings 124 formed in the attachment bracket 94.

Pivoting of the swing arm 106 in this manner alters the angular position of the lever 88 within the container 24, which affects how much force must be applied to the lever 88 in order to actuate the switch 96. For example, when the lever 88 is placed in the position shown in FIG. 6, in a relatively upright or horizontally extending orientation, a relatively small downward force will trigger the switch 96. The weight of grass clippings that accumulate on the lever 88 is directed straight downwardly. With the lever 88 in its upright position shown in FIG. 6, this force or weight of the clippings is directed a relatively large perpendicular distance from the lever's axis of pivot 108, which establishes a relatively large moment arm about the lever's pivot axis 108. This establishes a relatively large torque or moment about the pivot axis 108 thereby causing the lever 88 to pivot when relatively small forces are applied to the lever 88.

Figure 7:
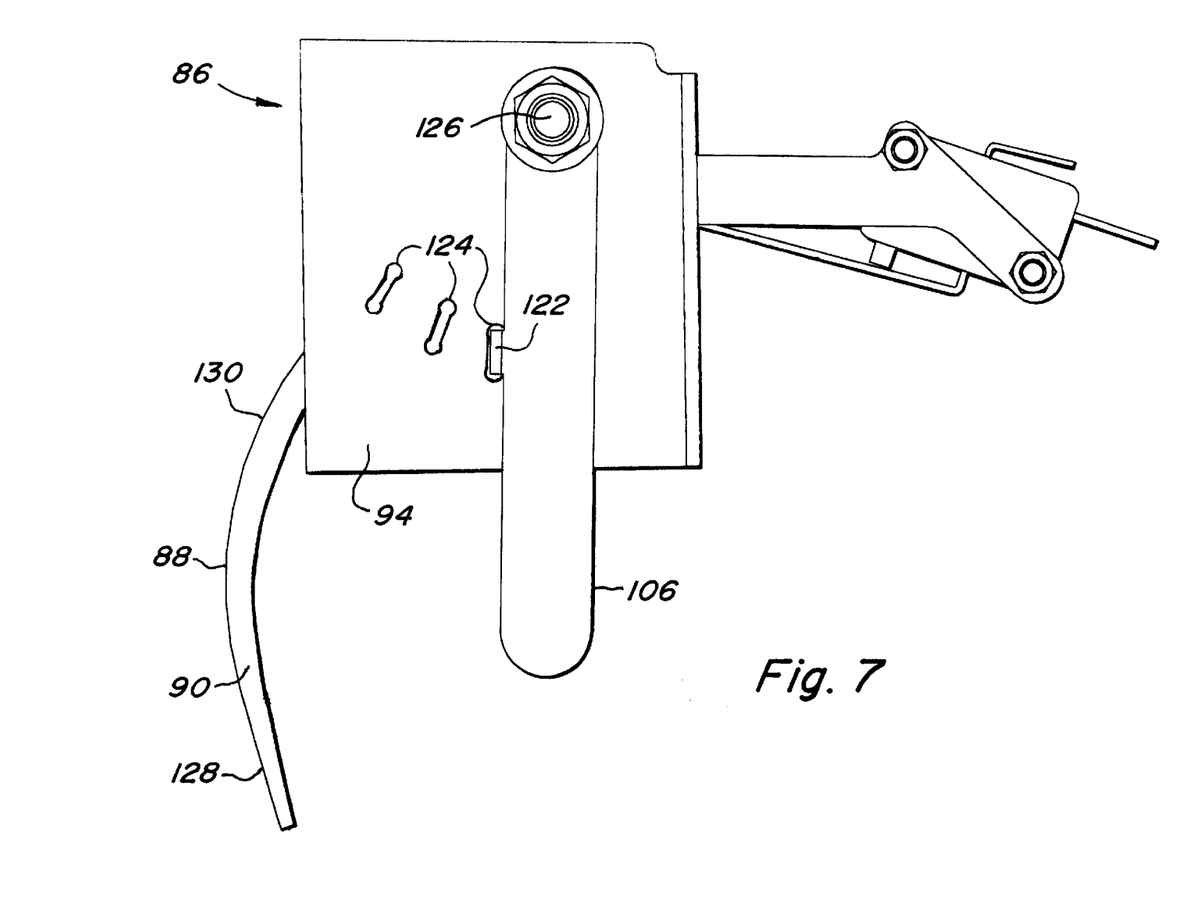
FIG. 7 is a side view of the fill indicator of FIGS. 2–5 according to the present invention, with the lever adjusted to its most downward vertical orientation.

The lever 88 can also be adjusted by manipulating the swing arm 106 to the more vertical position shown in FIG. 7. In this orientation the accumulated clippings on top of the lever 88 has weight that is directed downwardly but at a relatively close perpendicular distance from the lever's axis of pivot 108. This establishes a relatively small moment arm, which results in a relatively small torque force or moment. Therefore a relatively large force must be applied to the lever 88 in order to pivot the lever 88 and actuate the switch 96 when the lever 88 is adjusted by the operator to this orientation.

Figure 6:
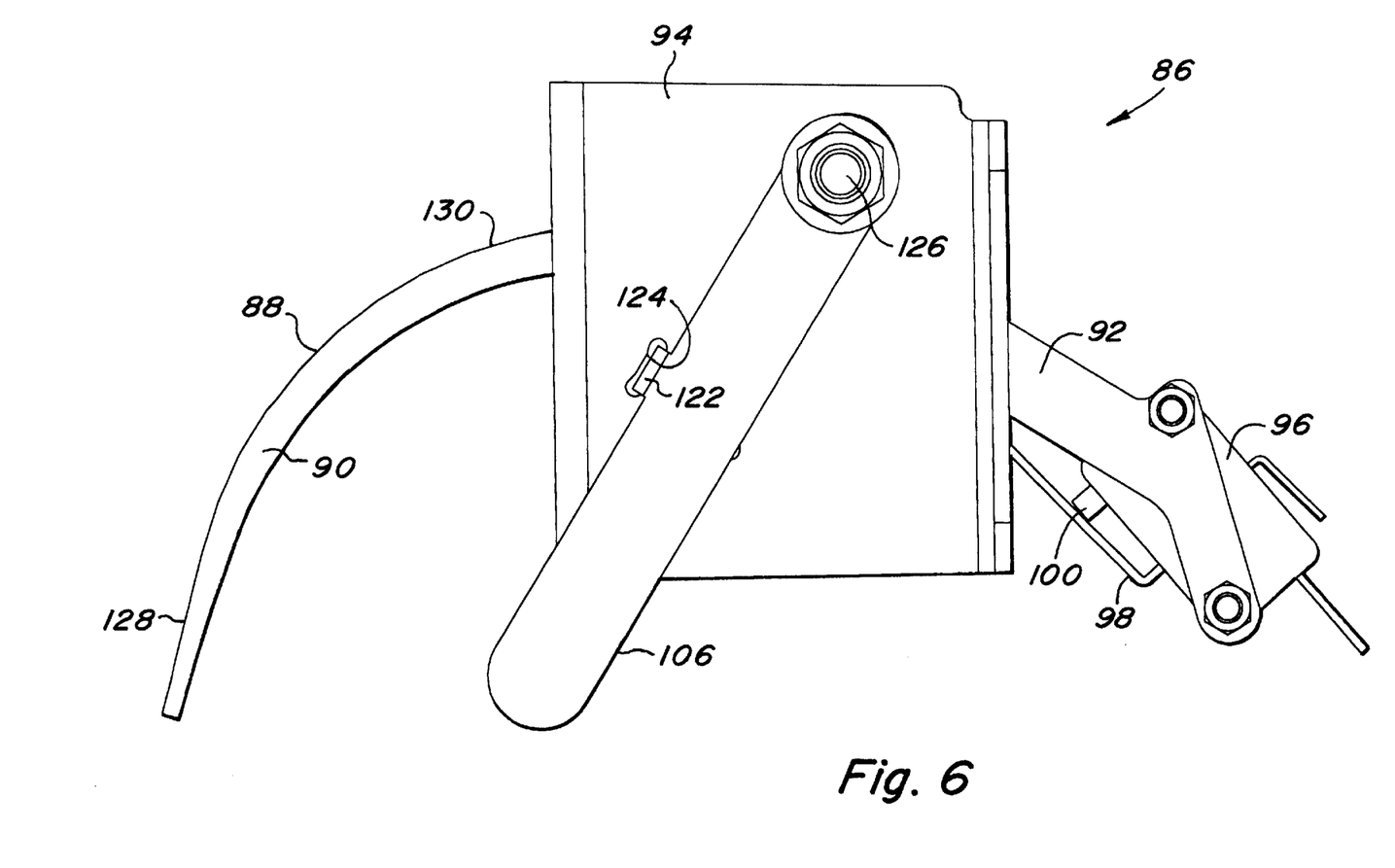
FIG. 6 is a side view of the fill indicator of FIGS. 2–5 according to the present invention, with the lever adjusted to its most upright horizontal orientation.

So when the lever 88 is positioned in outright fashion as shown in FIG. 6, a relatively small downward force will pivot the first portion 90 of the lever 88 downwardly, and when the lever 88 is positioned in a more vertical orientation as shown in FIG. 7, a larger downward force must be applied to the lever 88 to pivot the first portion 90 of the lever 88 downwardly. Therefore, when operating in light dry grass or when dry leaves are being collected, the operator may wish to set the swing arm 106 and lever to the position shown in FIG. 6, so that the light piles of matter accumulating in the container 24 will pile up on the lever 88 and thereby trigger the fill indicator as the clippings pile up near the chute outlet 104. This will help ensure that the switch 96 is engaged before the light clippings accumulate to such an extent within the container 24 that they begin to clog the chute outlet 104. When mowing heavy, wet grass, the operator may wish to set the swing arm 106 and lever 88 to the position shown in FIG. 7, so that heavy clippings circulating within the container 24 will not prematurely trigger the fill indicator 86. Since the lever 88 positioned in the orientation shown in FIG. 7 must be acted upon by a relatively large force in order to pivot the lever 88, the lever 88 will tend not to pivot if a small amount of heavy clippings falls on or contacts the lever 88. This helps prevent early triggering of the fill indicator 86 before the container 24 is completely filled. The fill indicator 86 according to the present invention allows the operator to adjust the angular orientation of the lever 88 to thereby alter the sensitivity of the fill indicator 86.

The particular shape of the first portion 90 of the lever 88 also affects how the lever 88 reacts to clippings within the container 24 as the lever 88 is adjusted or pivoted to its various positions. The lever 88 defines a downwardly curved shape and includes a wide portion or paddle portion 128 near the far end of the first portion 90, and a narrow portion 130 near the lever's pivot axis 108. When the lever 88 is positioned in its outright or horizontally extending mode as shown in FIG. 6, the wide portion 128 is oriented more horizontally for receiving downwardly directed forces from the weight of clippings accumulating near the fill indicator 86. Therefore, clippings can easily settle on or strike the wide portion 128 when oriented in this fashion. This helps ensure that even light dry clippings accumulating in that area will bear down upon the lever 88 and contribute to forcing the lever 88 downwardly to activate the switch 96. When the lever 88 is adjusted downwardly to its more vertical orientation as shown in FIG. 7, however, the wide portion 128 is oriented relatively vertically and is not positioned to readily receive downwardly directed forces from the weight of settling clippings. In this mode only the narrow portion 130 is oriented to receive downwardly directed forces from clippings. Light dry clippings are generally less likely to accumulate on the narrow portion 130 due to its smaller surface area, and therefore a more dense or greater accumulation of clippings is required to pivot the lever 88 when contacting the narrow portion 130 than when contacting the wide portion 128.

Furthermore, the wide portion 128 of the lever 88 is spaced a greater distance from the lever's pivot axis 108 than is the narrow portion 130, and therefore when the wide portion 128 is oriented as is shown in FIG. 6 to receive downwardly directed forces from clippings the moment arm established is relatively large, which creates a relatively large torque for pivoting the lever 88 about its axis. Relatively small downward forces applied to the wide portion 128 therefore result in relatively large torque applied to the lever 88. In this mode the lever 88 is relatively sensitive to light accumulations of grass, such as when mowing light dry grass or leaves. As stated above this has the advantage of causing the alarm to be triggered properly before the container 24 becomes filled and the chute 22 clogs when mowing light grass. When the lever 88 and wide portion 128 are in their downward position oriented more vertically as shown in FIG. 7, the narrow portion 130 receives a greater portion of the downward force of the weight of the clippings, and the wide portion 128 is oriented relatively vertically so as not to receive much downwardly directed forces from the weight of clippings. The narrow portion 130 is positioned closer to the pivot axis 108 of the lever 88 than is the wide portion 128, and therefore a smaller moment arm is established by clippings contacting the narrow portion 130 than the wide portion 128, which results in a smaller moment or torque for pivoting the lever 88. Therefore a greater force must be applied to the narrow portion 130 than the wide portion 128 in order to pivot the lever 88. The fill indicator 86 must therefore encounter larger downward forces in order to pivot the lever 88 downwardly when the lever 88 is adjusted to its more downward vertically oriented mode. As stated above, this is advantageous when mowing thick, wet or heavy grass, since the fill indicator 86 is less prone to be triggered by circulating clippings, and therefore less false alarms are sounded and the container becomes more completely filled before the alarm is triggered.

Figure 8:
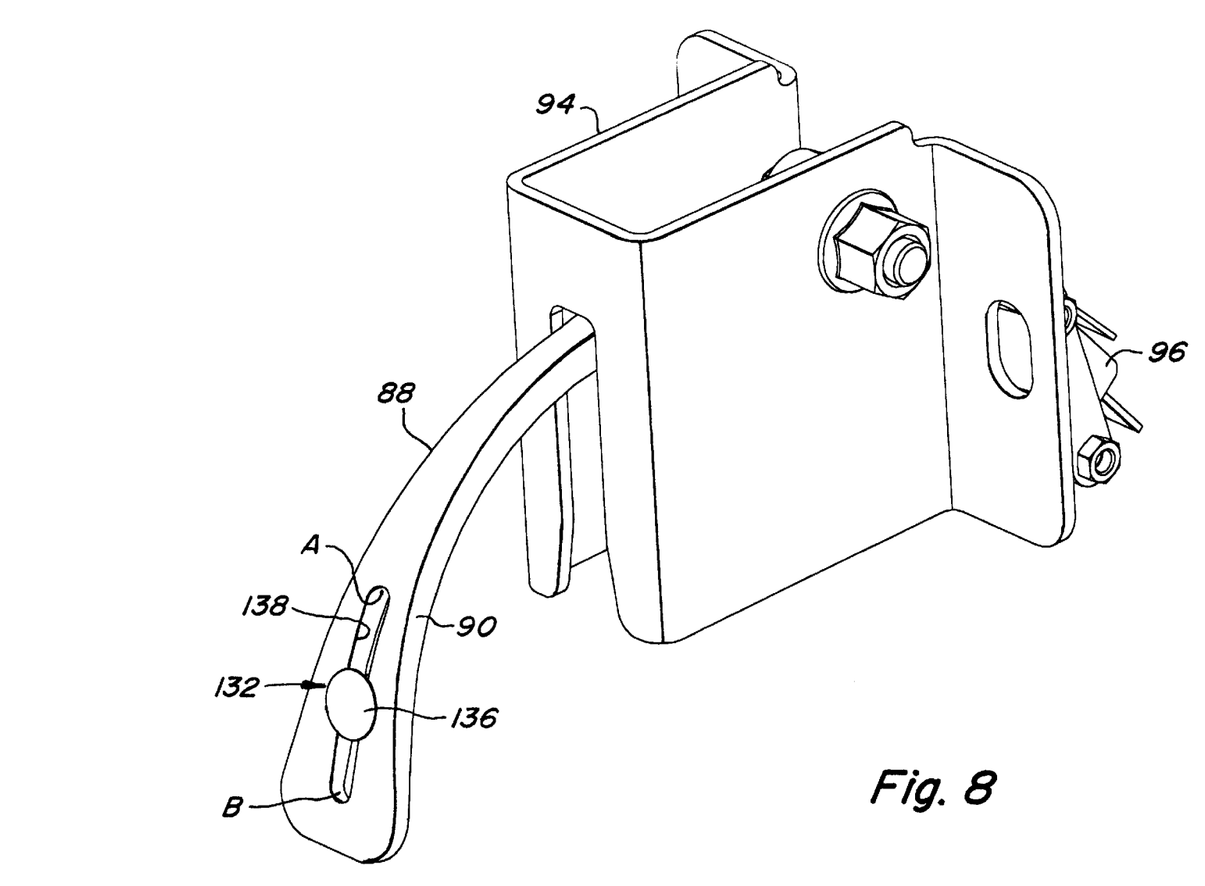
FIG. 8 is a perspective view of another embodiment of a fill indicator having a slidable weight member received within a slot formed in the lever.
Figure 9:
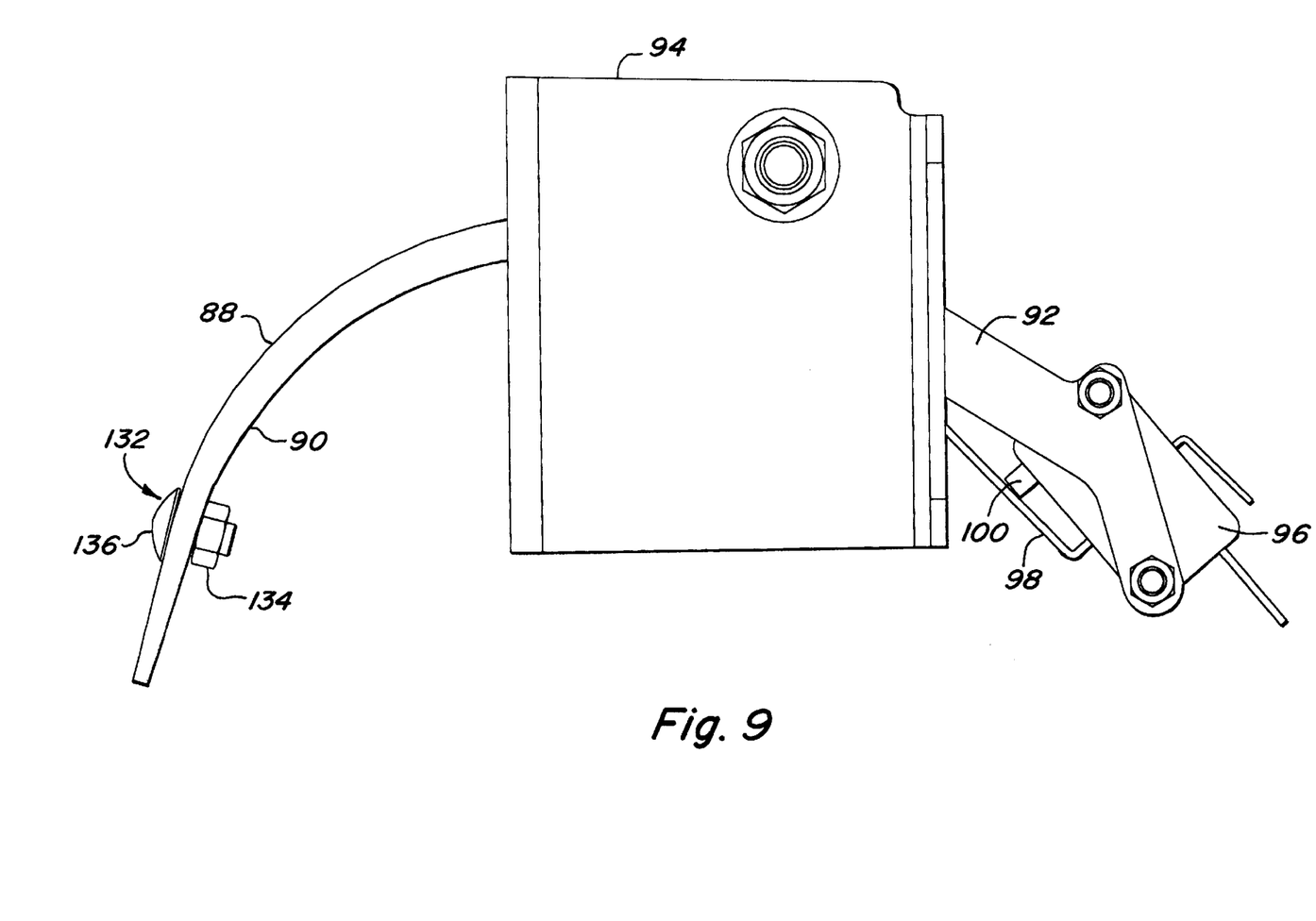
FIG. 9 is a side view of the fill indicator with weight member of FIG. 8.

An adjustable fill indicator can also be provided that includes a weight member 132 slidably mounted to the lever 88, as best seen in FIGS. 8–9. The weight member 132 includes a nut 134 and bolt 136 positioned within a slot 138 formed in the first portion 90 of the lever 88. The lever 88 and switch 96 shown in FIGS. 8 and 9 are not pivotally adjustable as is the fill indicator 86 shown in FIGS. 2–7. Rather, the position of the weight member 132 within the slot 138 formed in the lever 88 shown in FIGS. 8 and 9 is adjustable to alter the sensitivity of the lever 88 to pivoting. When the weight member 132 is positioned at point A shown in FIG. 8 in the end of the slot 138 nearest the switch 96 and relatively close to the pivot axis 108 of the lever 88, the weight of the weight member 132 is directed a relatively small perpendicular distance from the lever's pivot axis 108, which establishes a relatively small moment arm. Due to this relatively small moment arm, the weight of the weight member 132 applies only a relatively small torque force to the lever 88 for urging the lever 88 downwardly. Therefore, a relatively large downward load must be applied to the lever 88 by grass clippings in order to pivot the lever 88 downwardly and actuate the switch 96. The operator may wish to adjust the weight member 132 to this position when mowing wet or heavy grass. Since the lever 88 must encounter relatively large loads in order to pivot the lever 88 downward and actuate the switch 96, the lever 88 will tend not to pivot when airborne clippings strike the lever 88. False alarms are thereby reduced.

The operator can also loosen the nut 134 on the bolt 136 and shift the weight member 132 to point B at the end of the slot 138 farthest from the lever's pivot axis 108 and closest to the outer end of the lever 88. In this location the weight of the weight member 132 is directed a relatively large perpendicular distance from the lever's pivot axis 108, which establishes a relatively large moment arm and torque force applied to the lever 88. This torque force alone however is not large enough to pivot the lever 88 downwardly. Force must also be applied to the lever 88 by the weight of clippings within the container 24. Since the torque force applied to the lever 88 by the weight of the weight member 132 at point B is relatively large, only a relatively small force must be applied to the lever 88 by grass clippings in order to pivot the lever 88 downwardly and actuate the switch 96. Therefore, accumulations of relatively light grass that pile up on the lever 88 will have sufficient weight, in conjunction with the weight of the weight member 132 at point B, to pivot the lever 88 about the pivot axis 108 and actuate the switch 96. In this configuration the lever 88 is sufficiently sensitive to pivot under the relatively light force applied by light, dry grass and leaves. Therefore the fill indicator will sense the accumulation of a grass clippings pile at the location of the fill indicator before the clippings pile overflows into and clogs the chute outlet 104.

The operator may also infinitely adjust the weight member 132 to other positions within the slot 138 that result in optimum sensitivity for a particular set of operating conditions or for particular operator preferences.

FIGS. 8 and 9 show a fill indicator having a nut 134 and bolt 136 that can be loosened and shifted to a different location within the slot 138 and retightened to adjust the sensitivity of the fill indicator. Structures other than a nut 134, bolt 136 and slot 138 could be used without departing from the spirit of the present invention. Furthermore, the weight member 132 is shown with a lever 88 that is not pivotably adjustable, however could be used in combination with a pivotably adjustable lever 88 to enhance the adjustability of the fill indicator.

The present invention also provides a mechanism for improving the dispersal of clippings within the container 24. A V-shaped deflector 110 is positioned within the container 24 such that a portion of the clippings being blown into the container 24 through the chute outlet 104 will strike the deflector 110. The deflector 110 includes first and second surfaces 112 and 114 that define the deflector's "V" shape. Clippings contacting the first and second surfaces 112 and 114 will be directed either to the right or left within the container 24. This causes the laterally outer portions 116 of the container 24 to receive grass clippings. Clippings circulating in the laterally outer portions 116 of the container 24 will eventually settle to the bottom of the container 24 near the laterally outer edges of the container. The deflector 110 according to the preferred embodiment is positioned within the container 24 to be struck by the stream of clippings and so that a portion of the clippings stream passes directly beneath the deflector 110. Therefore a portion of the clippings stream will travel straight rearwardly and strike the rear wall 118 of the container 24. This ensures that the central portion 120 of the container 24 will also fill with clippings. The entire floor of the container 24 will therefore generally be covered with clippings.

Figure 1:
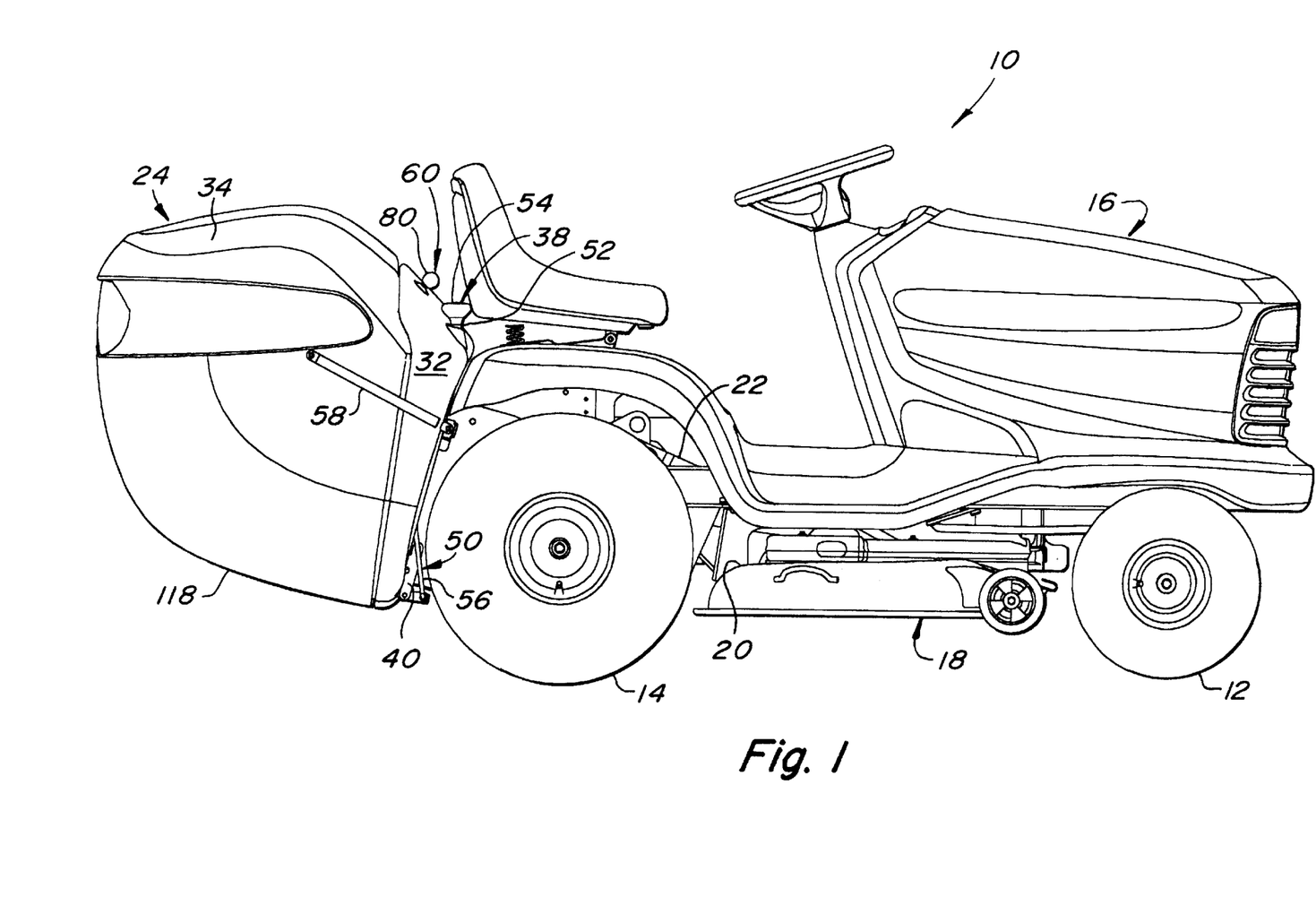
FIG. 1 is a side view of a mower vehicle with which the present invention is adapted for use, and which includes a clippings container mounted to the rear of the vehicle.
Figure 2:
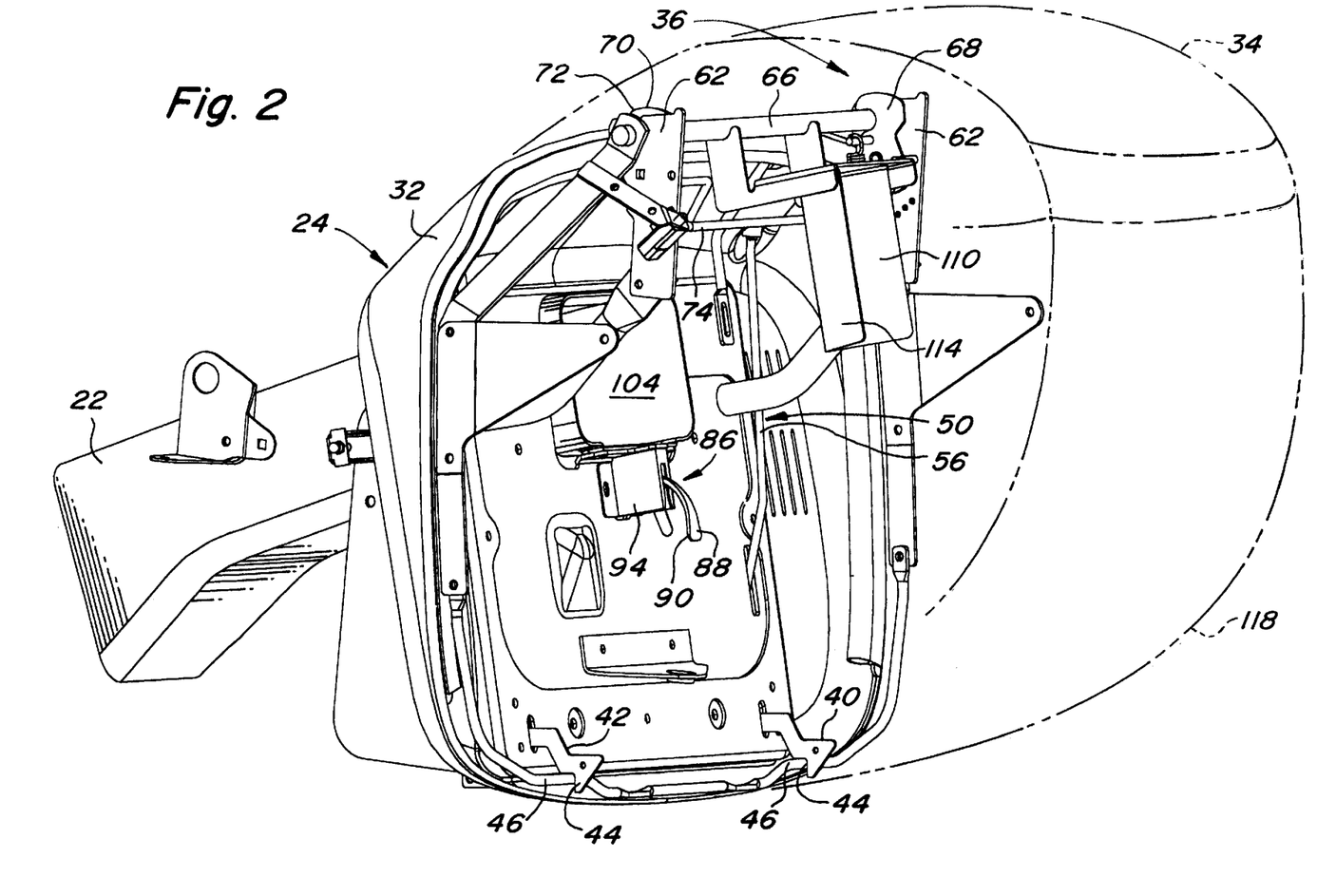
FIG. 2 is a perspective partial view of a chute and clippings container with which the present invention is adapted for use, with the plastic shell portion of the second portion of the container shown in phantom lines for clarity.
Figure 3:
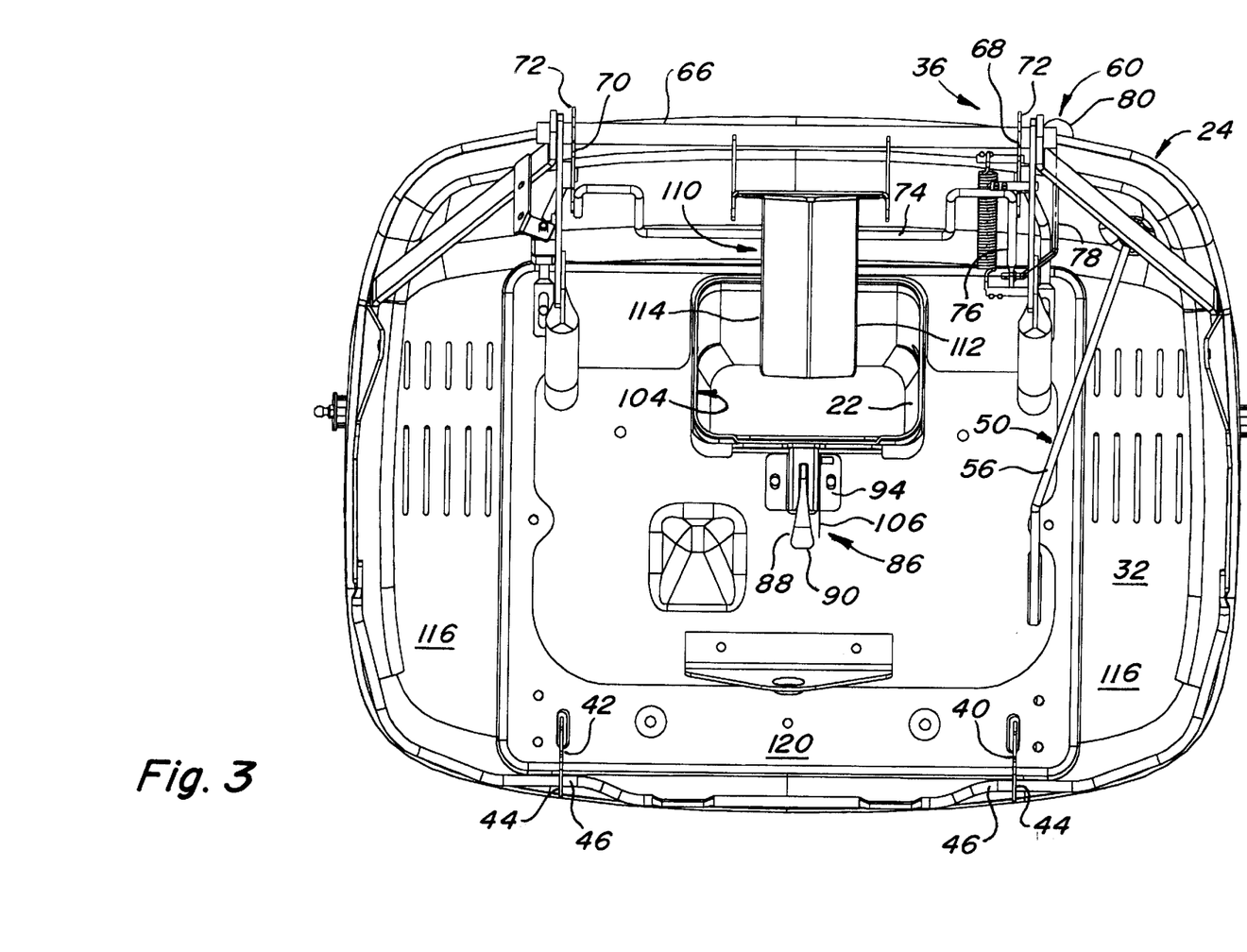
FIG. 3 is a view from the rear of the clippings container with the plastic shell portion of the second portion of the container not shown for clarity.
Figure 4:
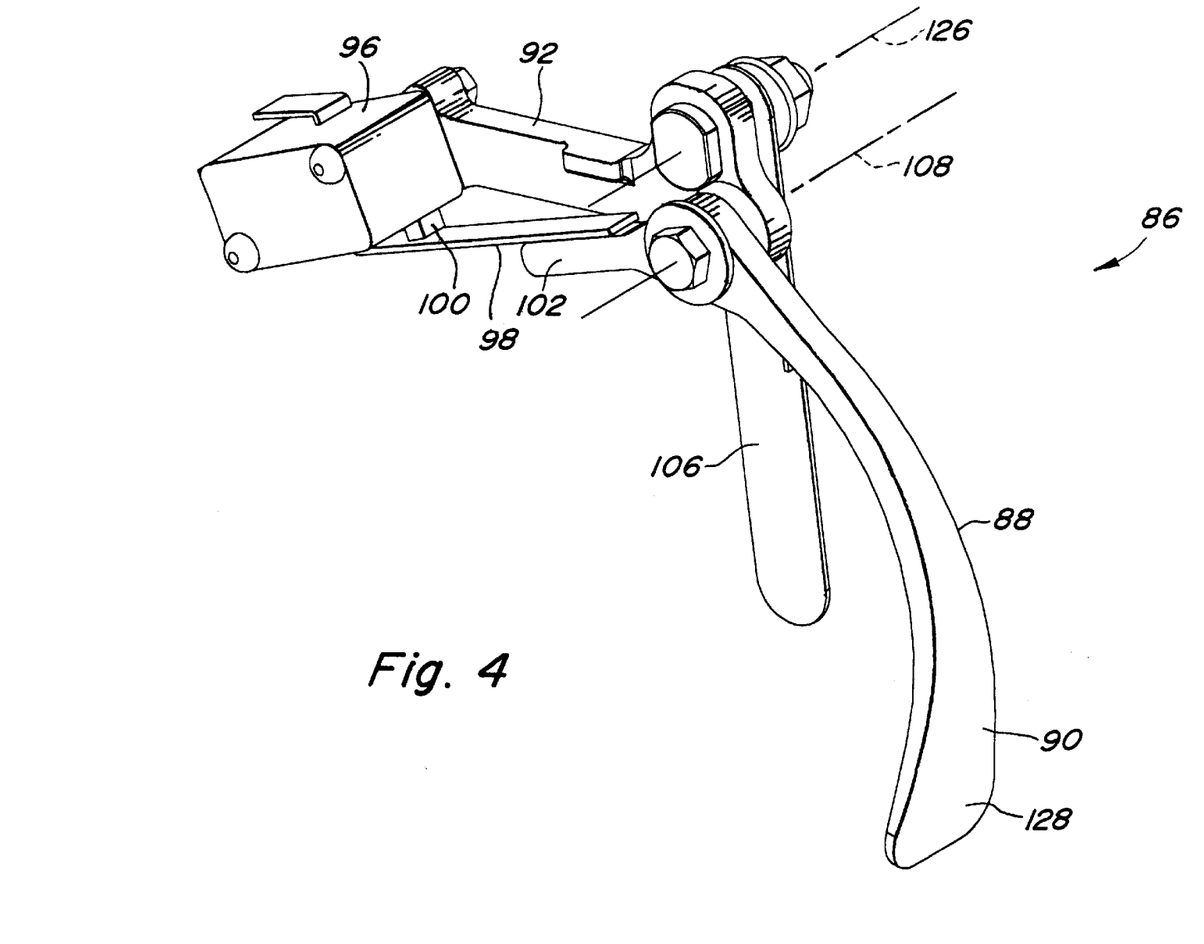
FIG. 4 is a partial perspective view of portions of the fill indicator shown in FIGS. 2 and 3 according to the present invention, with the attachment bracket not shown for the purpose of showing the components within the attachment bracket.
Figure 5:
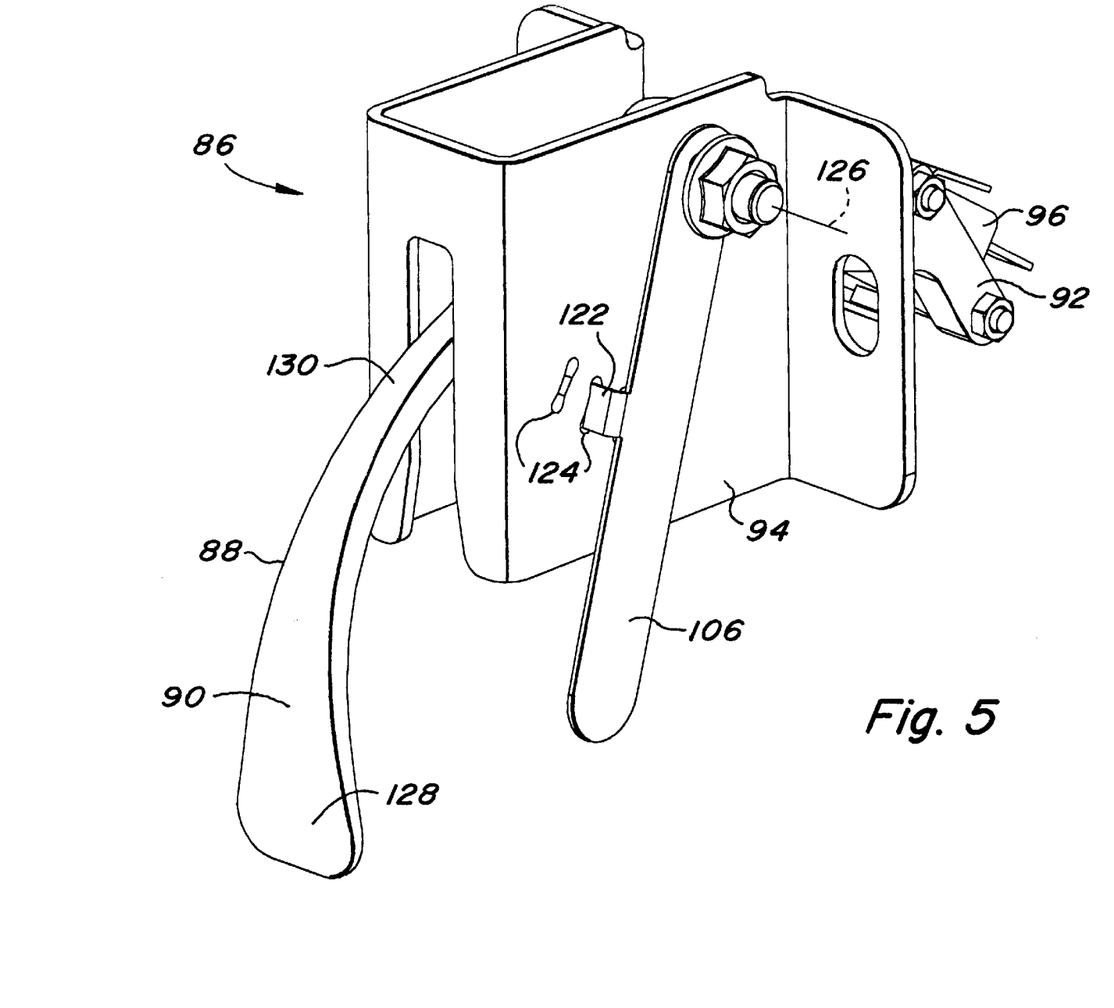
FIG. 5 is a perspective view of the fill indicator shown in FIGS. 2 and 3 according to the present invention, with the lever adjusted to its middle or intermediate positions.

If a deflector 110 as shown in FIGS. 1–3 is not utilized, then the clippings tend to be blown through the chute outlet 104 straight toward the rear wall 118 of the container 24, and these clippings tend to accumulate only in the center of the container 24 and not along the sides 116 of the container 24. A pile of clippings in the center of the container 24 would eventually accumulate until the fill indicator 86 is triggered, but the side portions 116 of the container 24 would be relatively empty. Therefore the container 24 would not be full, and the fill indicator 86 would be prematurely triggered. This would result in unnecessarily frequent stops to dump clippings. The deflector 110 according to the present invention improves the distribution of clippings within the container 24 such that the container 24 will hold a larger quantity of clippings and be more completely filled before the fill indicator 86 is triggered. This results in fewer interruptions to mowing operations for dumping clippings.

What is claimed is:

1. A fill indicator mechanism on a mower vehicle having a mower deck within which grass is cut, a chute through which grass clippings are directed from the mower deck, and a container into which the clippings from the chute are directed, said fill indicator mechanism further comprising:

a lever member positionable within said container, said lever being pivotable downwardly in response to contact with grass clippings accumulating within said container, a switch to which the lever member is operatively coupled, said switch being actuatable as the lever member pivots in response to contact with grass clippings within said container to thereby indicate to an operator that the container is approaching a filled condition, and at least a portion of said lever member contacts clippings within the container said portion being downwardly curved and having a relatively thin wide portion which contacts clippings within the container proximate the outer end of the lever and a narrow portion which also contacts clippings within the container positioned between the wide portion and the axis of pivot of the lever, said wide and narrow portions being swingably adjustable by an operator to a plurality of positions to alter an amount of downward force from clippings required to pivot the lever member.

2. The invention of claim 1, wherein said at least one portion of the lever is swingably adjustable about a generally horizontal and laterally extending axis.

3. The invention of claim 1, wherein said lever and switch are operatively mounted to each other and pivot together as a unit as the at least one portion of the lever member is swingably adjusted by the operator.

4. The invention of claim 1, wherein said lever member is pivotally adjustable about a generally horizontal and laterally extending axis.

5. The invention of claim 1, wherein said switch is engaged by an upper end portion of the lever member.

6. The invention of claim 1, wherein said lever curves downwardly from the axis of pivot of the lever to the outer end of the lever, and grass clippings accumulating in the container contact the outer surface of the curved lever for pivoting the lever to actuate the switch.

7. A fill indicator mechanism on a mower vehicle having a mower deck within which grass is cut into grass clippings, a chute through which grass clippings are directed from the mower deck, and a container into which the grass clippings from the chute are directed, said fill indicator mechanism further comprising:

a curved lever member positionable within said container, said lever being pivotable in response to contact with grass clippings accumulating within said container, a switch to which the lever member is pivotably coupled, said switch being actuatable as the lever member pivots in response to contact with grass clippings within said container to thereby indicate to an operator that the container is approaching a filled condition, and said switch and said lever member which contacts grass clippings in said container are swingably adjustable about a generally horizontally extending axis to a plurality of positions to alter an amount of downward force from clippings required to pivot the lever member, at least a portion of said lever member contacts clippings within the container, said portion being downwardly curved and having a relatively thin wide portion which contacts clippings within the container proximate the outer end of the lever and a narrow portion which contacts clippings within the container positioned between the wide portion and the axis of pivot of the lever, said wide and narrow portions being swingably adjustable by an operator to a plurality of positions to alter an amount of downward force from clippings required to pivot the lever member.

8. The invention of claim 7, wherein said lever member includes a paddle shaped surface having a wide portion proximate the outer end of the lever and a narrow portion positioned between the wide portion and the axis of pivot of the lever.

9. The invention of claim 8, wherein said lever curves downwardly from the axis of pivot of the lever to the outer end of the lever, and grass clippings accumulating in the container contacts the outer surface of the curved lever for pivoting the lever to actuate the switch.

10. A mower, comprising:

a mower deck within which grass is cut, a chute through which grass clippings are directed from the mower deck, a container into which the clippings from the chute are directed, a lever member positioned within said container, said lever being pivotable in response to contact with grass clippings accumulating within said container, a switch to which the lever member is pivotably coupled, said switch being actuated as the lever member pivots to an angular position in response to contact with grass clippings within said container to thereby indicate to an operator that the container is approaching a filled condition, and at least a portion of said lever member contacts clippings within the container for pivoting the lever and actuating the switch and is swingably adjustable about a generally horizontally extending axis by the operator to a plurality of positions to alter an amount of downward force from clippings required to pivot the lever member, said lever and switch are operatively mounted to each other and pivot together as a unit as the at least one portion of the lever member is swingably adjusted by the operator, wherein said lever includes a downwardly curved, relatively thin wide portion proximate the outer end of the lever which contacts clippings within the container and a progressively narrower downwardly curved portion positioned between the wide portion and the axis of pivot of the lever and which also contacts clippings within the container.

11. A mower, comprising:

a mower deck within which grass is cut into grass clippings, a chute through which grass clippings are directed from the mower deck, a container into which the grass clippings from the chute are directed, a lever member positioned within said container, said lever being pivotable in response to contact with grass clippings within said container, a switch to which the lever member is pivotably coupled, said switch being actuated as the lever member pivots to an angular position in response to contact with grass clippings within said container to thereby indicate to an operator that the container is approaching a filled condition, and said lever member and switch are swingably adjustable about a generally horizontally extending axis to a plurality of positions to alter an amount of downward force from clippings required to pivot the lever member said lever includes a downwardly curved paddle shaped surface having a wide thin portion which contacts clippings within the container proximate the outer end of the lever and a progressively narrower portion which contacts clippings within the container positioned between the wide portion and the axis of pivot of the lever, wherein the wide portion of the lever member is contacted by grass clippings within the container and pivots downwardly in response to said contact with the grass clippings.

* * * * *